United States Patent [19]

Kim

[11] Patent Number: 5,287,177
[45] Date of Patent: Feb. 15, 1994

[54] CIRCUIT FOR GENERATING MOVING IMAGE TRACKING CURSOR

[75] Inventor: Hyeong-kwon Kim, Seoul, Rep. of Korea

[73] Assignee: Samsung Electronics Co., Ltd., Suwon, Rep. of Korea

[21] Appl. No.: 901,105

[22] Filed: Jun. 19, 1992

[30] Foreign Application Priority Data

Jun. 19, 1991 [KR] Rep. of Korea .................. 91-10324

[51] Int. Cl.$^5$ ............................................. H04N 5/225
[52] U.S. Cl. ................................. 348/169; 348/700; 348/341
[58] Field of Search ................ 358/125, 224, 105; H04N 5/225

[56] References Cited

U.S. PATENT DOCUMENTS 4,561,061 12/1985 Sakamoto et al. ................. 364/550
4,628,353 12/1986 Davis et al. ....................... 358/107
5,196,929 3/1993 Miyasaka ........................... 358/125

FOREIGN PATENT DOCUMENTS 64-48571 2/1989 Japan.

OTHER PUBLICATIONS

Hanna et al, "Novel Technology for Automatic Focusing and White Balancing of Solid State Color Video Camera" (IEEE Transaction on Consumer Electronics, vol. CE-29, No. 3, Aug. 8, 1983, pp. 376-382).

Primary Examiner—Howard W. Britton
Attorney, Agent, or Firm—Sughrue, Mion, Zinn, Macpeak & Seas

[57] ABSTRACT

A circuit for generating a moving image tracking cursor in a camera, including a pickup for converting optical information into an electrical signal, a video signal processor for separating the picked-up signal into luminance and color signal, a filter for filtering only a high-band component of the separated luminance signal, a converter for converting the filtered signal into a digital signal, a detector for receiving the digital signal by predetermined intervals of picture, dividing the receiving signal by a plurality of subscreens, and integrating it by the subscreens, a motion forecasting circuit for calculating the difference between a current signal output from the converter and a precedingly detected signal, a cursor generator for variably designating the location of cursor in the subscreen where the largest integration is detected proportionally to the predicted amount of movement of the object, and a signal converter for mixing the cursor signal and a composite video signal.

1 Claim, 1 Drawing Sheet

CIRCUIT FOR GENERATING MOVING IMAGE TRACKING CURSOR

BACKGROUND OF THE INVENTION

The present invention relates to a circuit for generating a moving image tracking cursor in a camera, and more particularly to a circuit for generating a moving image tracking cursor which can generate a cursor while tracking a moving object to be photographed.

Usually, the center of a picture to be photographed is indicated by a crossed hair in a video camera. The crossed hair is, however, simply dependent upon a mechanical method for indicating the center's location.

According to the method, the crossed hair is marked on the glass of an electronic view finder (EVF) screen, or is displayed after a picture's center is found by counting horizontal sync signals.

However, the former has a problem in that the location of the crossed hair does not correspond to the picture's center. The latter can locate the crossed hair at the exact center of the picture. However, neither method is capable of displaying the crossed hair in accordance with the movement of an object to be photographed, by tracking it.

Accordingly, in the above conventional methods, when taking a picture of a moving object, the user must fit the crossed mark to the object's center by moving the camera, so that the horizontal and vertical balance of a picture is not precisely maintained and the object to be photographed is difficult to track.

SUMMARY OF THE INVENTION

Therefore, it is an object of the present invention to provide a circuit for generating a moving image tracking cursor which generates a crossed cursor while tracking a moving object, so as to prevent in advance the unbalance of a photographing state during photographing of the moving object.

To accomplish the object, there is provided a circuit for generating a moving image tracking cursor in a camera, comprising: a pickup for converting optical information about an object into an electrical signal; a video signal processor for separating the picked-up signal into luminance and color signals to output them as a composite video signal; a filter for filtering only a high-band component of the separated luminance signal; a converter for converting the filtered signal into a digital signal; a detector for receiving the digital signal by predetermined intervals of picture, dividing the received signal by a plurality of subscreens, and integrating it by the subscreens to detect the region having the largest integration; a motion forecasting circuit for calculating the difference between a current signal output from the converter and a precedingly detected signal to predict the amount of movement of the object; a cursor generator for variably designating the location of a cursor in the subscreen where the largest integration is detected proportional to the predicated amount of movement of the object so as to generate a cursor signal; and a signal converter for mixing the cursor signal and composite video signal.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
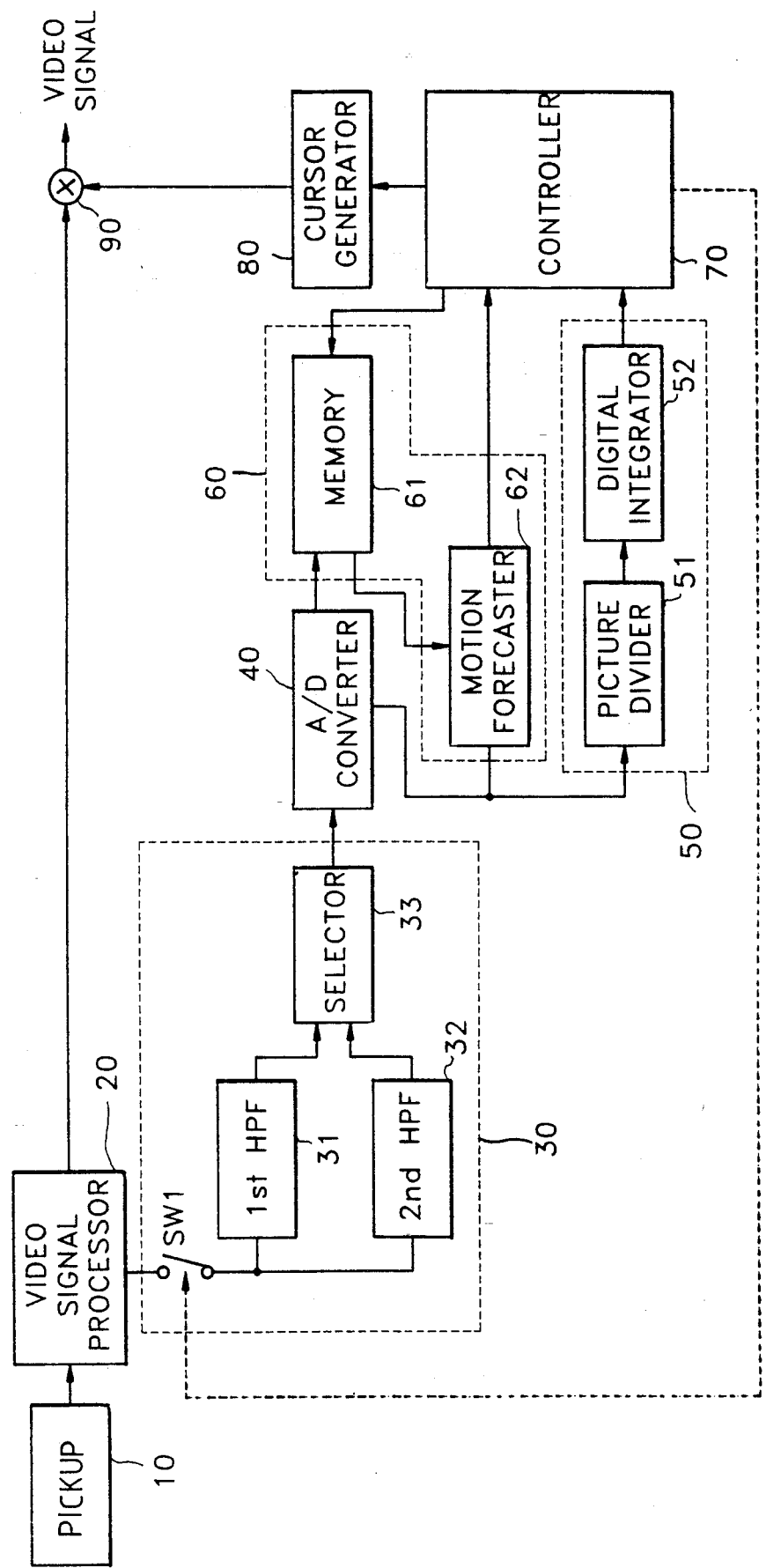
FIG. 1 is a circuit diagram of a motion picture tacking cursor generating circuit.

Referring to FIG. 1, a circuit for generating a moving image tracking cursor of the present invention, comprises: a pickup 10 for converting optical information about an object to be photographed into an electrical signal; a video signal processor 20 for separating the signal output from pickup 10 into luminance and color signals to output them as a composite video signal; a prefilter 30 for detecting a high-band component of the luminance signal output from video signal processor 20; an A/D converter 40 for converting the output of prefilter 30 into a digital signal; a motion detector 50 for dividing the output of A/D converter 40 into regions for integration; a motion forecasting circuit 60 for storing the luminance output from A/D converter 40 by predetermined picture intervals and calculating the difference between a precedingly stored output and a current output from A/D converter 40, that is, the amount of movement to predict the movement until a next picture is picked up; a controller 70 for, in every nth picture, controlling an address for generating a cursor at a corresponding point by dividing the largest integration region of the output of motion detector 50 or controlling, in all pictures except every nth picture, an address for generating a cursor proportional to the amount of movement predicted by motion forecasting circuit 60; a cursor generator 80 for generating a crossed cursor at a picture corresponding to the output address of controller 70; and a mixer 90 for mixing the crossed cursor generated from cursor generator 80 with the composite video signal of video signal processor 20.

In order to generate a cursor according to an object's movement, prefilter 30 comprises a control switch SW1 switched according to a control signal output from controller 70 for receiving the luminance signal separated from video signal processor 20, first and second high-pass filters 31 and 32 for detecting a high-band component which indicates the contour components of the object from the luminance signal separated from video signal processor 20, and a selector 33 for selecting the outputs of first and second high-pass filters 31 and 32.

Motion detector 50 comprises a picture divider 51 for dividing the output of A/D converter 40 by predetermined regions (subscreens) with respect to one picture, and a digital integrator 52 having a full adder to integrate the output of picture divider 51 by regions.

Motion forecasting circuit 60 comprises a memory 61 for storing every nth picture among the output of A/D converter 40 by fields, and a motion forecaster 62 for calculating the difference between a field precedingly stored in memory 61 and a current field to predict the amount of movement.

The operation of the circuit of the present invention will be described below.

Referring to FIG. 1, pickup 10 converts optical information about a moving object into an electrical signal. As well known in the art, pickup 10 comprises a camera lens (not shown) for receiving optical information about an object, a potentiometer (not shown) installed on a zoom ring of the camera lens for detecting zoom location information, a diaphragm for controlling the intensity of incident light, and a CCD for outputting the optical information about the object input via the camera lens as an electrical signal.

Video signal processor 20 separates the signal output from pickup 10 into luminance and color signals so as to output them as a composite video signal. The separated luminance signal is output to a well-known prefilter 30 according to the switching of control switch SW1. The prefilter 30 may correspond, for example, to the prefilter disclosed in the article entitled "Novel Technology for Automatic Focusing and White Balancing of Solid State Color Video Camera", by Hanma et al. *IEEE Transaction on Consumer Electronics,* Vol CE-29, No. 3, August 1983.

Controller 70 closes control switch SW1 only when the user wants to generate a cursor while tracking the movement of an object.

First and second high-pass filters 31 and 32 detect a high-band component of the luminance output from video signal processor 20. Since the characteristic of the camera lens of pickup 10 is that the cutoff frequency becomes higher during better focusing and lower during poorer focusing, selector 33 selects first high-pass filter 31 during the poor focusing and selects second high-pass filter 32 during the better focusing. The operation of selector 33 may be derived from the operation of the prefilter discussed in the above-mentioned article.

A/D converter 40 converts the output of first or second high-pass filter 31 or 32 selected by selector 33 into a digital signal which is stored in memory 61. Here, memory 61 stores the output of A/D converter 40 by fields by predetermined picture intervals (e.g., every ninth picture) according to the control signal of controller 70.

Picture divider 51 divides a picture by a predetermined number of regions (64 in the present invention). Digital integrator 52 digitally integrates each of the regions with the full adder.

Controller 70 controls cursor generator 80 so as to generate a cursor in the region having the largest integration among those output from digital integrator 52. This is because the object to be photographed will be present in this region.

Cursor generator 80 compares the cursor generating address generated from controller 70 and the address generated from a cursor address generator (not shown) of cursor generator 80 so as to output a crossed cursor to mixer 90 when the two addresses are equal. Cursor generator 80 is well known in the art and may correspond, for example, to the cursor generator disclosed in U.S. Pat. No. 4,628,353.

Meanwhile, in the case of pictures input not by the predetermined interval, motion forecaster 62 compares currently input field data and field data precedingly stored in memory 61. In other words, motion forecaster 62 calculates the displacement between the location of cursor precedingly generated from motion detector 50 nd the location of a current cursor, and the moving direction of the cursor, then outputs a control signal to controller so as to generate a cursor in the corresponding path. Motion forecasters are known in the art. For example, the operation of a motion forecaster is disclosed in Japanese Laid-Open Specification No. 64-48571 and U.S. Pat. No. 4,561,061.

To generate the cursor, controller 70 recognizes a signal corresponding to a predicted location of cursor output from motion forecaster 62 and outputs an address corresponding to the location to cursor generator 80.

Mixer 90 mixes the composite video signal output from video signal processor 20 with the crossed cursor generated from cursor generator 80. Here, the crossed cursor is output according to the movement of an object and as a continuously varied signal, so that the moving object can be photographed while being tracked, allowing the user to precisely fit the crossed hairs (indicating the lens center) to the crossed cursor. This easily prevents the horizontal and vertical imbalance of a photograph, which is due to the camera being mispositioned during photographing.

As described above, in detail the circuit for generating a moving image tracking cursor can precisely photograph a moving object and prevent an unbalanced photograph when photographing a moving object, by generating a crossed cursor for tracking the object to be photographed.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A circuit for generating a moving image tracking cursor in a camera, comprising:
    pickup means for converting optical information about an object into an electrical signal;
    video signal processor means for separating the picked-up signal into luminance and color signals to output them as a composite video signal;
    filter means for filtering only a high-band component of the separated luminance signal;
    converter means for converting the filtered signal into a digital signal;
    detector means for receiving the digital signal by predetermined picture intervals, dividing the receiving signal into a plurality of subscreens, and integrating it by the subscreens to detect the region having the largest integration;
    motion forecasting means for calculating the difference between a current signal output from said converter and a precedingly detected signal to predict the amount of movement of the object;
    cursor generator means for variably designating the location of a cursor in the subscreen where the largest integration is detected proportional to the predicted amount of movement of the object so as to generate a cursor signal; and
    signal converter means for mixing the cursor signal and composite video signal.

* * * * *